United States Patent
Lee et al.

(10) Patent No.: US 8,954,235 B2
(45) Date of Patent: Feb. 10, 2015

(54) SYSTEM AND METHOD FOR ENHANCED STEERING OVERRIDE DETECTION DURING AUTOMATED LANE CENTERING

(75) Inventors: Jin-Woo Lee, Rochester Hills, MI (US); Bakhtiar Brian Litkouhi, Washington, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/101,271

(22) Filed: May 5, 2011

(65) Prior Publication Data

US 2012/0283910 A1    Nov. 8, 2012

(51) Int. Cl.
| | |
|---|---|
| *B62D 6/00* | (2006.01) |
| *G05D 1/00* | (2006.01) |
| *G06F 7/00* | (2006.01) |
| *G05D 3/00* | (2006.01) |
| *B62D 1/28* | (2006.01) |
| *B62D 15/02* | (2006.01) |
| *B60W 50/06* | (2006.01) |
| *B60W 50/10* | (2012.01) |

(Continued)

(52) U.S. Cl.
CPC .............. *B62D 1/286* (2013.01); *B62D 15/025* (2013.01); *B60W 50/06* (2013.01); *B60W 50/10* (2013.01); *B60W 10/20* (2013.01); *B60W 30/12* (2013.01); *B60W 2540/18* (2013.01)
USPC .................................. 701/41; 701/43; 701/45

(58) Field of Classification Search
CPC ...... B60K 28/02; B60W 50/10; B60W 50/12; B62D 5/046; B62D 6/002; B62D 6/10; B62D 7/159
USPC .............................................. 701/41, 43, 45
See application file for complete search history.

(56) References Cited

U.S. PATENT DOCUMENTS

| | | | | | |
|---|---|---|---|---|---|
| 5,998,952 | A | * | 12/1999 | McLaughlin et al. | ........ 318/432 |
| 6,050,359 | A | * | 4/2000 | Mouri et al. | ................... 180/415 |

(Continued)

FOREIGN PATENT DOCUMENTS

| | | |
|---|---|---|
| DE | 10 2004 006 540 A1 | 7/2010 |
| EP | 1602562 B1 | 12/2009 |

OTHER PUBLICATIONS

Liu et al. On Torque Control of Vehicle Handling and Steering Feel for Avoidance Maneuver with Electric Power Steering, Jul. 2008, Proceedings of the 17th World Congress the International Federation of Automatic Control.*

(Continued)

*Primary Examiner* — Fadey Jabr
*Assistant Examiner* — Thomas Ingram
(74) *Attorney, Agent, or Firm* — Mark S. Cohen; Pearl Cohen; Zedek Latzer Baratz LLP

(57) ABSTRACT

A method and system may measure one or more vehicle steering measurements or quantities and calculate one or more expected vehicle steering measurements. The method and system may deactivate an automatic vehicle control system based on the one or more measured vehicle steering measurements and the one or more expected vehicle steering measurements. The vehicle steering measurements may include a vehicle steering angle measurement, vehicle steering torque measurement, or other vehicle dynamics measurements. The automatic vehicle control system may include an automated lane centering system, lane keeping assist, or other autonomous vehicle steering control system.

20 Claims, 7 Drawing Sheets

(51) Int. Cl.
*B60W 10/20* (2006.01)
*B60W 30/12* (2006.01)

(56) References Cited

U.S. PATENT DOCUMENTS

| | | | |
|---|---|---|---|
| 6,198,992 | B1* | 3/2001 | Winslow ............................ 701/23 |
| 6,665,603 | B2* | 12/2003 | Jindo et al. ........................ 701/96 |
| 2001/0054519 | A1* | 12/2001 | Nishiwaki et al. .............. 180/167 |
| 2003/0168275 | A1* | 9/2003 | Sakugawa ...................... 180/402 |
| 2008/0091318 | A1 | 4/2008 | Deng et al. |
| 2009/0319113 | A1 | 12/2009 | Lee |
| 2010/0131233 | A1 | 5/2010 | Deng et al. |
| 2010/0228420 | A1 | 9/2010 | Lee |

OTHER PUBLICATIONS

U.S. Appl. No. 13/101,346, filed May 5, 2011, Lee et al.
U.S. Appl. No. 13/101,308, filed May 5, 2011, Lee et al.
U.S. Appl. No. 13/101,397, filed May 5, 2011, Lee et al.
Pilutti, Tom et al., "Vehicle Steering Intervention Through Differential Braking," Transactions of the ASME, vol. 120, Sep. 1998, pp. 314-321.
Kyongsu, Yi et al., "An investigation into differential braking strategies for vehicle stability control," Proceedings of the Institution of Mechanical Engineers, Part D: Journal of Automobile Engineering, 2003, pp. 1081-1093.
Office Action for DE Patent No. 102012207525.9 dated Sep. 4, 2013.

\* cited by examiner

SYSTEM AND METHOD FOR ENHANCED STEERING OVERRIDE DETECTION DURING AUTOMATED LANE CENTERING

FIELD OF THE INVENTION

The present invention is related to methods and systems to determine an override event for an automated steering system or method using, for example, a combination of steering angle, steering torque, and other data.

BACKGROUND

Many vehicles are equipped with autonomous and/or semi-autonomous driving systems, applications, and/or features. Autonomous and semi-autonomous driving systems may provide automated driving controls that reduce the driver action required for operating the vehicle. Automated lane centering methods, features, and applications, for example, may be activated by the driver while the vehicle is in motion and may maintain the vehicle position in the center of a lane. Adaptive lane centering systems, may maintain a constant lane offset, or vehicle position relative to a lane on the road the vehicle is driving upon. Adaptive lane centering systems may reduce driver fatigue and increase safety by maintaining the vehicle position with respect to the road with reduced driver input.

Safety considerations may be taken into account when designing a vehicle lane centering system or other autonomous driving systems. In order to conform to safety requirements, an adaptive lane centering application may be overridden by the driver at any time. When the driver overrides the vehicle lane centering system, the system relinquishes full steering control of the vehicle to the driver. Many autonomous or semi-autonomous steering control override detection systems and methods, however, may not be reliable and may not accurately detect a vehicle steering override condition. Many vehicle automated steering systems may be less reliable at high and low speeds. For example, at low speed a steering wheel requires higher levels of torque to maneuver, and an autonomous steering feature may falsely interpret a slight steering wheel movement to be a steering override event. At high speed, a vehicle steering system may, for example, be too sensitive and have a high steering override threshold. As a result, a driver may oversteer in order to gain control of the vehicle, and the vehicle steering system override detection system may lag behind the steering wheel input causing a sudden movement or jerk in the steering wheel.

SUMMARY

A method and system may measure one or more vehicle steering measurements or quantities and calculate one or more expected vehicle steering measurements. The method and system may deactivate an automatic vehicle control system based on the one or more measured vehicle steering measurements and the one or more expected vehicle steering measurements. The vehicle steering measurements may include a vehicle steering angle measurement, vehicle steering torque measurement, or other vehicle dynamics measurements. The automatic vehicle control system may include an automated lane centering system, lane keeping assist, or other autonomous vehicle steering control system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
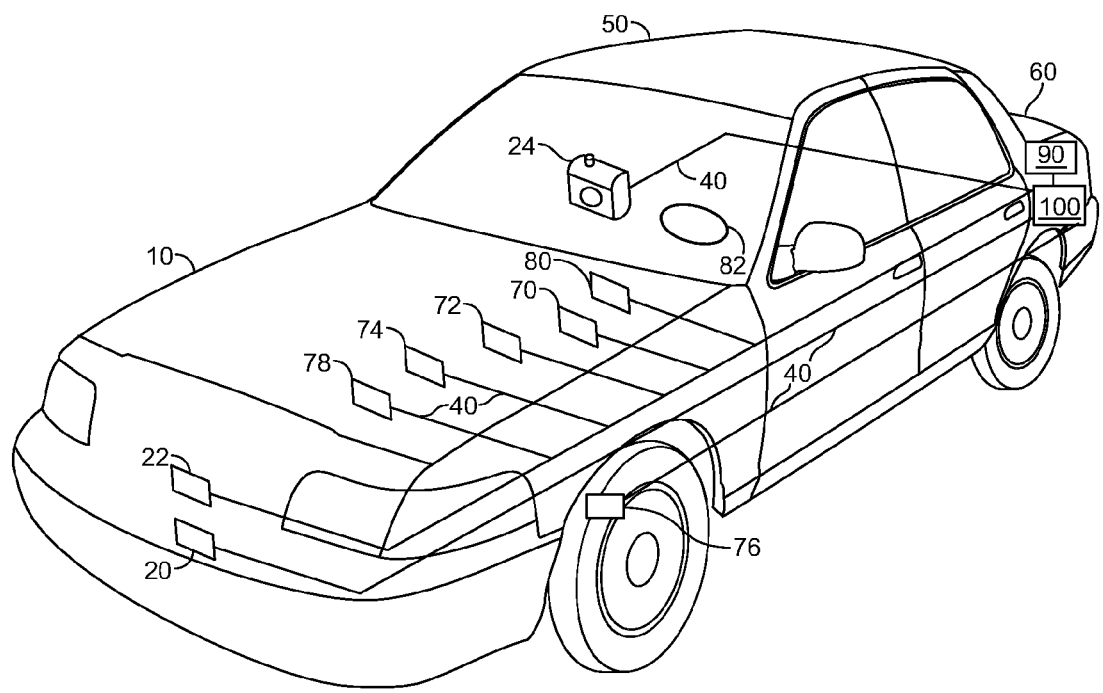
FIG. 1 is a schematic diagram of a vehicle with a vehicle automated steering override detection system according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, throughout the specification discussions utilizing terms such as "processing," "computing," "storing," "calculating," "determining," "evaluating," "measuring," "providing," "transferring," "outputting," "inputting," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Autonomous, semi-autonomous, automated, or automatic steering control features (e.g., automated lane centering, adaptive lane centering, etc.) may maintain or control the position of a vehicle with respect to the road with reduced driver input (e.g., steering wheel movement). In order to comply with safety requirements, however, the driver may need to regain full control of the vehicle steering controls and deactivate or disengage the steering control system. The driver may regain control of the vehicle, for example, when another vehicle swerves into the driver's lane, an obstacle lies in front of the vehicle, the vehicle comes into close proximity with a guardrail, the driver switches lanes, or in other circumstances. When driver encounters a circumstance requiring the driver to regain control of the steering quickly, an automated vehicle steering system override may have to be performed quickly and easily. An automated vehicle steering override detection system may, therefore, be required to function with high precision at low speeds, high speeds, on curved roads, on banked roads, and in other driving scenarios. At lower speeds more torque may be required to steer the vehicle than at high speeds; therefore, the minimum torque required to override the system may be higher at low speeds than high speeds. At higher speeds, less torque may be required to steer the vehicle than at low speeds; therefore, the minimum torque required to override the automated steering control system may be lower at high speeds to ensure the driver may easily regain control of the vehicle if needed. When a vehicle turns while driving on a curved road or banked road, greater or less steering torque may be required to steer the vehicle depending on the direction of the turn. According to embodiments of the present invention, an automated vehicle steering control override system may adapt to different driving scenarios or conditions. An automated vehicle steering control override system may adapt to driving scenarios by calculating expected steering torque and steering angle values based on measured, calculated and/or pre-determined vehicle steering measurements.

In one embodiment of the present invention, a vehicle may be equipped with an adaptive or automatic lane centering feature or application. An adaptive lane centering feature may maintain a constant lane offset or vehicle position relative to a lane on the road the vehicle is driving upon. A computer vision sensor (e.g., a camera), LIDAR sensor, or other type of sensor may measure data allowing an adaptive lane centering feature to determine the lane offset or relative location of the vehicle with respect road features, for example, lane markers(s), road shoulder(s), median barrier(s), edge of the road and other objects or features. The relative location of the vehicle with respect to road features may be determined based on, for example, the global positioning system (GPS) location data and the map database of the vehicle, a forward facing camera measured relative distance to road features, and/or other information. The adaptive lane centering feature may control the vehicle steering based on the determined relative position of the vehicle in order to maintain constant or relatively constant (e.g., with a resolution of 10 cm) vehicle lane offset or position within a lane. The adaptive lane centering feature, in some embodiments, may control the direction of vehicle travel by controlling the steering angle and/or steering torque of the vehicle by outputting a steering angle control command to an electrical power steering (EPS), active front steering (AFS), or other system. The adaptive lane centering feature may, in some embodiments, control the steering angle directly or with or without an EPS, AFS or other system.

In one embodiment of the present invention, a vehicle may be equipped with an automated lane keeping assist application or feature. A lane keeping assist application may automatically control the vehicle steering to ensure that the vehicle stays within a pre-determined lane or path on the road. A lane keeping assist application may, in some embodiments, not control the vehicle steering unless the vehicle begins to move out of a lane, at which point the lane keeping assist system may automatically control the steering to maintain the vehicle within the lane. A lane keeping assist feature may function by determining the relative position of the vehicle with respect to road features (e.g., lane marker(s), road shoulder(s), median barrier(s), or other road features) and adjusting the steering control to maintain the vehicle within a lane. The relative position of the vehicle with respect to road features may be determined based on the GPS location data of the vehicle, vehicle measured relative distance to road features, or other information. The lane keeping assist feature may control the vehicle steering based on the determined relative position of the vehicle in order to maintain the vehicle within a lane. The lane keeping assist feature may control the direction of vehicle travel by controlling the steering angle and/or steering torque of the vehicle by outputting a steering angle and/or steering torque control command to an EPS, an AFS, or other system. The lane keeping assist feature may, in some embodiments, control the steering angle directly or with or without an EPS, AFS or other system.

According to embodiments of the present invention, an automated steering control override system may measure, estimate, or evaluate, using sensor(s) associated with the vehicle, vehicle steering measurements or vehicle steering conditions such as the steering angle and steering torque of a vehicle. Vehicle steering measurements or vehicle steering conditions may be measured, estimated, or evaluated at predetermined intervals (e.g., every 10 milliseconds) while the vehicle is in motion. In some embodiments, automated steering control override detection system may measure steering angle conditions and steering torque conditions of a vehicle continuously while the vehicle is in motion. Other vehicle dynamics information, for example, speed, acceleration, heading, yaw-rate, lane offset, driver input, and other factors may also be measured.

According to embodiments of the present invention, a vehicle automated steering override detection system may determine, based on the measured vehicle steering measurements (e.g., steering torque, steering angle), and/or other information (e.g., speed, acceleration, heading, yaw-rate, other driver input, etc.) of a vehicle, whether to override, de-activate, or disengage an automated vehicle steering control system. Embodiments of the present invention may, for example, be employed while a vehicle automated steering system is engaged, activated or functioning. The vehicle automated steering override detection system may measure the steering angle, steering torque, acceleration, lateral acceleration, longitudinal acceleration, speed, yaw-rate and/or other vehicle dynamics or steering measurements while the vehicle automated steering control system is activated.

According to embodiments of the present invention, an automatic vehicle control system may be activated and may output a steering angle command to an automated steering override detection system. An automated steering override detection system may based on, for example, the steering angle command calculate an expected steering angle and/or expected steering torque. The automated steering override detection system may compare the expected steering angle and/or expected steering torque to sensor measured steering angle and/or sensor measured steering torque. If the absolute value of the difference between measured steering torque and the expected steering torque is greater than a predetermined threshold torque value, then an automated steering control system may be disengaged. If the absolute value of the difference between measured steering angle and the expected steering angle is greater than a predetermined threshold steering angle value, then an automated steering control system may be disengaged.

In one embodiment of the present invention, an automated steering override detection system may disengage an automated steering control system if the absolute value of the difference between measured steering angle and the expected steering angle is greater than a predetermined threshold steering angle value and/or the absolute value of the difference between measured torque and the expected steering torque is greater than a predetermined threshold torque value. The predetermined threshold steering angle and predetermined threshold torque values may depend or vary based on vehicle speed(s), road condition(s), curvature of the road, steering system dynamics, type of vehicle, and/or other factors. Other or different vehicle steering or vehicle dynamics measurements may factor into the decision to override. The terms measurement, parameter, condition, value, and other terms may, in some embodiments, be used interchangeably and have equivalent meaning.

FIG. 1 is a schematic diagram of a vehicle with a vehicle automated steering override detection system according to an embodiment of the present invention. A vehicle 10 (e.g., a car, truck, or another vehicle) may include a vehicle automated steering override detection system 100. Vehicle automated steering override detection system 100 may operate in conjunction with or separate from one or more automatic vehicle control systems, autonomous driving applications or vehicle automated steering systems 90. Vehicle automated steering system 90 may, for example, be an adaptive lane centering, low speed lane centering, lane keeping assist, or other application. One or more vehicle automated steering system(s) 90 may be component(s) of system 100, or vehicle automated steering system(s) 90 may be separate from system 100. Vehicle automated steering system 90 may, when engaged, fully or partially control the steering of the vehicle and reduce driver (e.g., operator of the vehicle) steering control input via the steering wheel 82 and/or steering system, which may include an electrical power steering (EPS) system and/or other components.

One or more sensor(s) may be attached to or associated with the vehicle 10. A computer vision sensor (e.g., a camera) 24, LIDAR, or laser radar (LADAR), sensor 20, radar sensor 22, imager, or other remote sensing device may obtain data allowing system 100 to determine the relative location of the vehicle with respect road features, for example, lane markers(s), road shoulder(s), median barrier(s), edge of the road and other objects or features. Camera 24 may, for example, measure lane offset, heading angle, lane curvature and/or other information (e.g., speed, acceleration, yaw-rate, other driver input etc.) and provide the information to system 90. Vehicle automated steering control system 90 may maintain or control the position of a vehicle with respect to the road based on the sensor measured relative location of the vehicle with respect to road features.

In one embodiment of the present invention, vehicle 10 may include one or more devices or sensors to measure vehicle steering measurements, vehicle steering conditions, vehicle steering parameters, vehicle dynamics, driver input, or other vehicle related conditions or measurements. The vehicle dynamics measurement device(s) may include one or more steering angle sensor(s) 70 (e.g., connected to steering wheel 82 and/or another component of the steering system) and/or steering torque sensor(s) 80 (e.g., a torsion bar, torsion sensor, torquemeter, torque transducer, or other device). Steering torque sensor(s) 80 may be connected to or associated with steering wheel 82, a steering column, steering rack and pinion, a vehicle axle, and/or another component of the steering system. The vehicle dynamics measurement device(s) may also include one or more accelerometer(s) 72, speedometer(s) 74, wheel speed sensor(s) 76, inertial measurement unit(s) (EMU) 78, or other devices. The vehicle dynamics measurement device(s) may measure vehicle dynamics conditions or driver input including steering angle, steering torque, steering direction, lateral (i.e., angular or centripetal) acceleration, longitudinal acceleration, yaw-rate, lateral and longitudinal velocity, speed, wheel rotation, and other vehicle dynamics characteristics of vehicle 10. The measured vehicle dynamics, vehicle conditions, steering measurements, steering conditions, or driver input information may be transferred to system 100 via, for example, a wire link (e.g., a controller area network (CAN) bus, Flexray, Ethernet) 40 or a wireless link. The measured vehicle dynamics, vehicle conditions, steering measurements, steering conditions, or driver input information data may be used by system 100 or another system to calculate steering angle, steering torque, dead reckoning based vehicle position, and other calculations.

In one embodiment of the present invention, vehicle automated steering override detection system 100 is or includes a computing device mounted on the dashboard of the vehicle, in passenger compartment 50 or in trunk 60. In alternate embodiments, vehicle automated steering override detection system 100 may be located in another part of the vehicle, may be located in multiple parts of the vehicle, or may have all or part of its functionality remotely located (e.g., in a remote server or in a portable computing device such as a cellular telephone).

While various sensors and inputs are discussed, in certain embodiments only a subset (e.g. one) type of sensor or input may be used.

Figure 2:
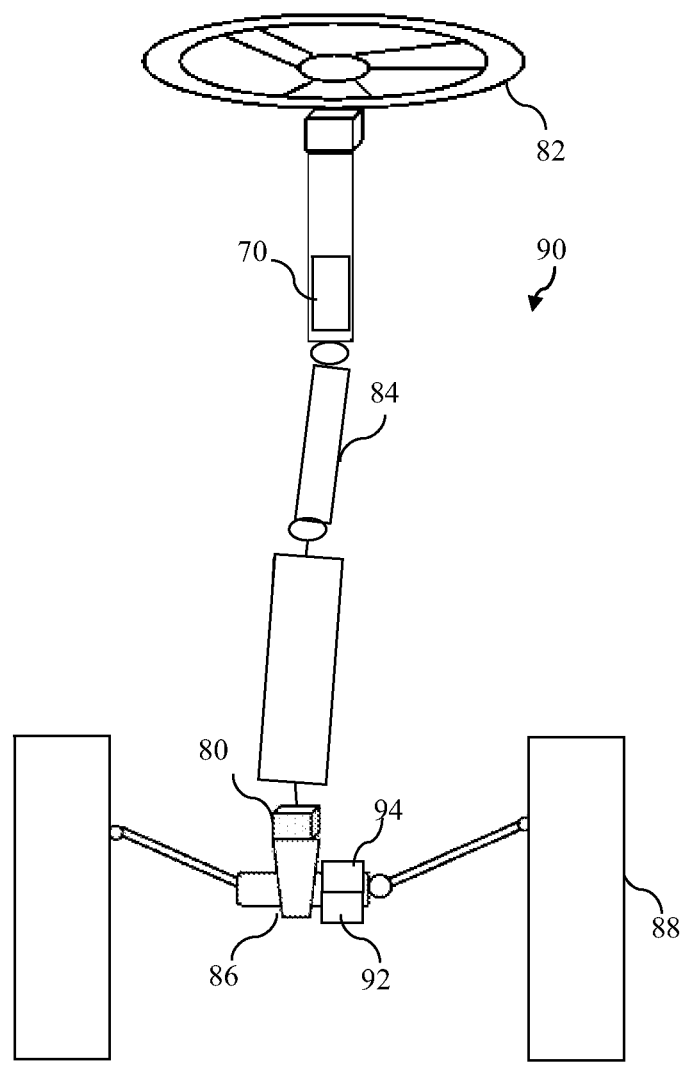
FIG. 2 is a schematic depiction of a vehicle automated steering system according to an embodiment of the present invention.

FIG. 2 is a schematic depiction of a vehicle automated steering system according to an embodiment of the present invention. Vehicle automated steering system 90 may be installed in a vehicle (e.g., a car, an automobile, truck, or another vehicle). System 90 may include a steering wheel 82 connected to a steering column 84. The steering column 84 may be connected to a rack and pinion 86, which converts or transforms the rotary motion of the steering wheel 82 and steering column 84 into linear motion or displacement of the vehicle tires or wheels 88. A steering angle sensor 70 may be mounted to the steering wheel 82, steering column 84, an EPS system 92, an AFS system 94, or be otherwise associated with the automated steering control system 90. A steering torque sensor 80 (e.g., steering torsion bar, torsion sensor, torquemeter, torque transducer, or other device) may be mounted to the steering column 84, steering wheel 82, rack and pinion 86, wheel axle or be otherwise associate with the automated steering control system 90. Steering torque sensor 80 and steering angle sensor 70 may, in some embodiments, be associated with or mounted on EPS 92, AFS 94, or other systems.

Figure 3:
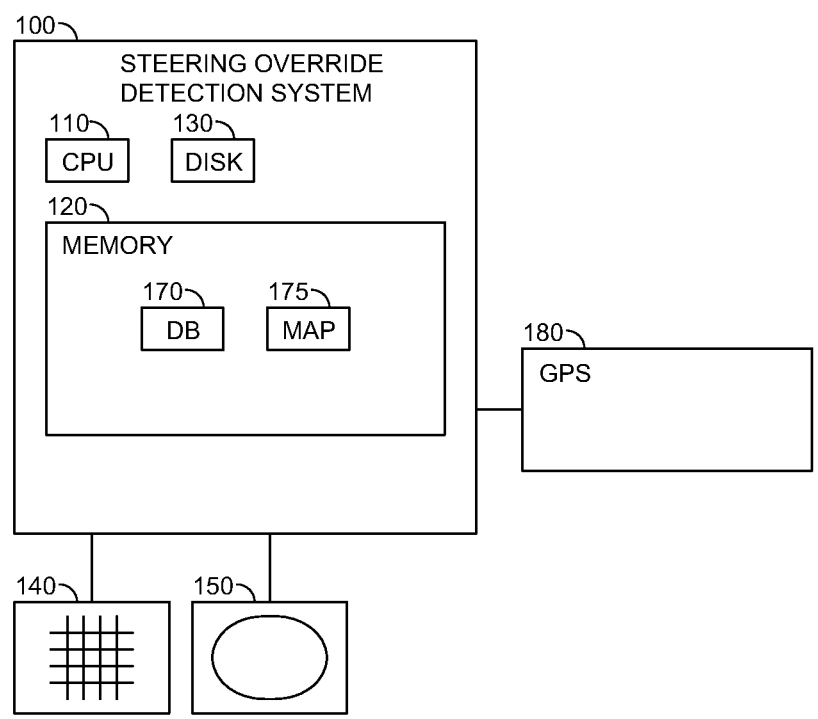
FIG. 3 is a schematic diagram of a vehicle automated steering override detection system according to an embodiment of the present invention.

FIG. 3 is a schematic diagram of a vehicle automated steering override detection system according to an embodiment of the present invention. Autonomous or automated steering override detection system 100 may include one or more processor(s) or controller(s) 110, memory 120, long term storage 130, input device(s) or area(s) 140, and output device(s) or area(s) 150. Input device(s) or area(s) 140 may be, for example, a touchscreen, a keyboard, microphone, pointer device, or other device. Output device(s) or area(s) 150 may be, for example, a display, screen, audio device such as speaker or headphones, or other device. Input device(s) or area(s) 140 and output device(s) or area(s) 150 may be combined into, for example, a touch screen display and input which may be part of system 100.

System 100 may include one or more databases 170, which may include, for example, steering angle thresholds, steering torque thresholds, steering inertia information, steering damping information, steering stiffness information, and other information or data. Databases 170 may be stored all or partly in one or both of memory 120, long term storage 130, or another device.

Processor or controller 110 may be, for example, a central processing unit (CPU), a chip or any suitable computing or computational device. Processor or controller 110 may include multiple processors, and may include general-purpose processors and/or dedicated processors such as graphics processing chips. Processor 110 may execute code or instructions, for example, stored in memory 120 or long-term storage 130, to carry out embodiments of the present invention.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 4:
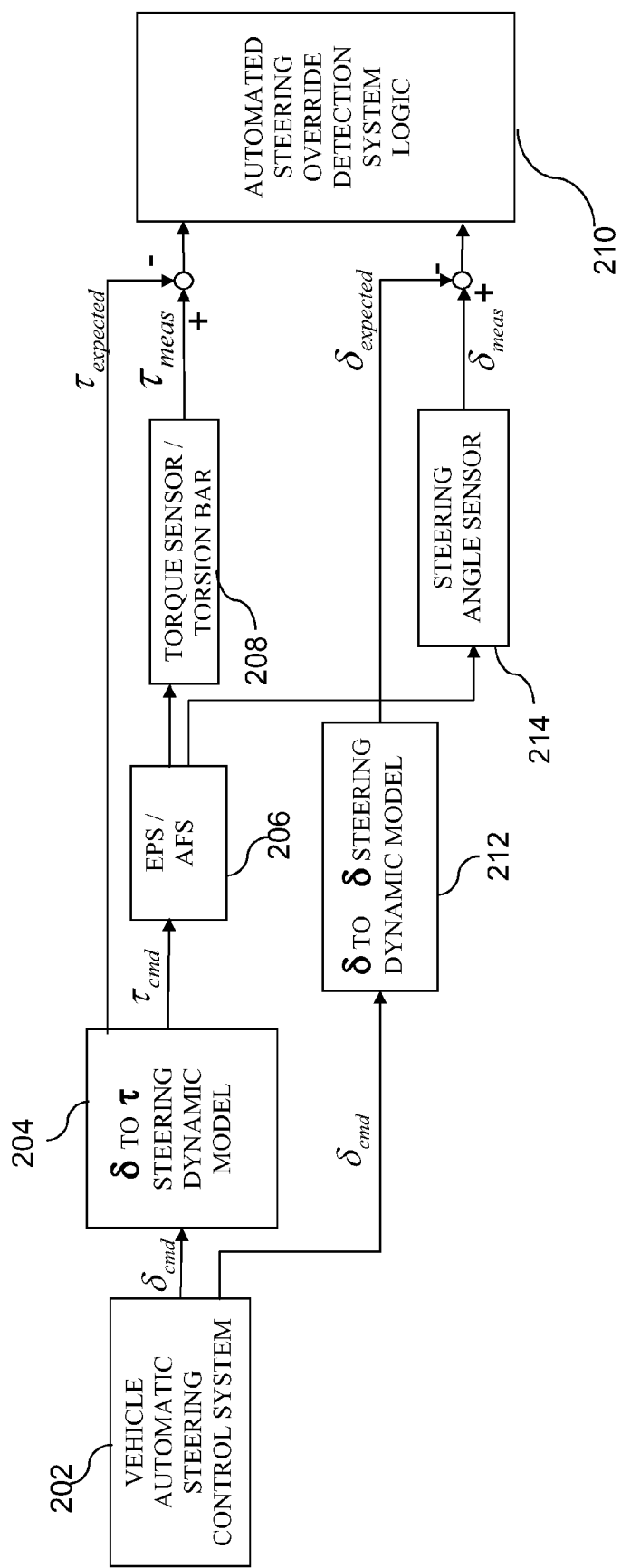
FIG. 4 is a block diagram of a steering override detection system and process according to an embodiment of the present invention.

FIG. 4 is a block diagram of a steering override detection system and process according to an embodiment of the present invention. As depicted in block 202, a steering angle command, $\delta_{cmd}$, may be output by a vehicle automated steering system 90 (e.g., adaptive lane centering, automated lane centering, or other system). As depicted in block 204, a steering torque command, $\tau_{cmd}$, from may be calculated based on the steering angle command, $\delta_{cmd}$, the vehicle automated steering control system 90.

Steering angle command, $\delta_{cmd}$, in some embodiments, be the steering angle change that the vehicle automated control system outputs to a vehicle steering system, motor associated with the vehicle steering system, or other component of vehicle steering system in order to change the direction of the vehicle. Steering torque command, $\tau_{cmd}$, may be the steering torque that automated steering control system 90 outputs to EPS system 92, AFS system 94, or other system to steer and/or change the direction of vehicle. Steering torque command, $\tau_{cmd}$, may, in some embodiments, be the sum of a driver assist torque and an overlay torque. A driver assist torque may be the torque applied by EPS system 92, AFS system 94, or other system to aid the driver in steering vehicle. Driver assist torque may be zero when a vehicle automated steering system 90 is engaged, and the driver is not steering vehicle 10. An overlay torque may be the torque applied by a vehicle automated steering system 90 in order to actuate the vehicle steering.

In some embodiments, an expected steering torque, $\tau_{expected}$, and a steering command torque, $\tau_{cmd}$, may be calculated, as illustrated in block 204. Expected steering torque, $\tau_{expected}$, may be the torque that the system 100 expects to be applied to the vehicle steering system or component(s) of the vehicle steering system when the driver or operator of the vehicle is not attempting to override the automated steering control system. Expected steering torque, $\tau_{expected}$, may be, in some embodiments, the torque that system 100 expects to be output from vehicle automated steering system 90. Expected steering torque, $\tau_{expected}$, may be calculated based on steering angle measured, $\delta_{meas}$, and vehicle steering parameter(s), constant(s) and/or pre-determined values using a second-order model, approach, or method; a look-up table; or other method or approach. Steering command torque, $\tau_{cmd}$, may be calculated based on steering angle command, $\delta_{cmd}$, using a second-order model, approach, or method; a look-up table; or other method or approach.

Steering command torque, $\tau_{cmd}$, may be input to an EPS system, AFS system or another system, as illustrated in block 206. Steering command torque, $\tau_{cmd}$, may be the torque that a motor associated with the EPS system, AFS system or other system applies to the steering wheel 82, steering column 84, a component of the automated steering control system 90, or another component of the vehicle steering system.

As illustrated in block 208, steering command torque, $\tau_{cmd}$, may be input into the torque sensor 80 (e.g., a torsion bar, torque transducer, or other device). Torque sensor 80 may measure torque applied to vehicle steering system, $\tau_{meas}$. Torque applied to vehicle steering system or torque measured, $\tau_{meas}$, may, for example, be applied to the steering wheel 82, steering column 84, vehicle axle or another portion of the vehicle steering system or apparatus. Torque applied to the vehicle steering system, $\tau_{meas}$, may include steering command torque, $\tau_{cmd}$, applied by EPS, AFS or another system, and driver inputted torque, $\tau_{driver}$, which may be the amount of torque the driver inputs to steering wheel 82. Steering torque measured, $\tau_{meas}$, may be measured or evaluated by torque sensor 80 (e.g., a torsion bar, torquemeter, torsion sensor, or other device), as depicted in block 208. Steering torque measured, $\tau_{meas}$, may include the amount of torque applied to the steering wheel 82 or related system by driver, for example, to regain full or partial control of the vehicle steering system.

As depicted in block 210, the difference between steering torque measured, $\tau_{meas}$, and expected steering torque, $\tau_{expected}$, may be calculated. If the absolute value or magnitude of the difference is greater than a pre-determined threshold torque, $\tau_{thresh}$, an automatic steering control system 90 may be de-activated, disengaged, or overridden by system 100. The pre-determined threshold torque, $\tau_{thresh}$, may be determined during or prior to manufacturing of vehicle 10 and may be based on vehicle testing, human factor studies, or other factors. The pre-determined threshold torque, $\tau_{thresh}$, may include buffer or additional torque to take into account driver interaction with the steering system that is not intended to override automatic steering control system 90.

According to embodiments of the present invention, an expected steering angle, $\delta_{expected}$, from the may be calculated by system 100 based on steering angle command, $\delta_{cmd}$, from the vehicle automated steering control system 90, as illustrated in block 212. Expected steering angle, $\delta_{expected}$, may be the steering angle or maximum steering angle that the system expects to be applied to the vehicle steering system or component(s) of the vehicle steering system when the driver or operator of the vehicle is not attempting to override the automated steering control system. The expected steering angle, $\delta_{expected}$, may be calculated based on steering angle command, $\delta_{cmd}$, using a look-up table, simple second order system, second order system, or other mathematical approach or method. The expected steering angle, $\delta_{expected}$, may, in some embodiments, vary from steering angle command, $\delta_{cmd}$, due to vehicle dynamics and steering control variables (e.g., latency, delay and system lag in the steering control system).

Steering angle sensor 70 may measure the steering angle input applied to vehicle steering system, $\delta_{meas}$, as depicted in block 214. Steering angle input may, for example, be applied to the steering wheel 82, steering column 84, vehicle axle or another portion of the vehicle steering system or apparatus. Steering angle measured, $\delta_{meas}$, may include the steering angle input applied to the vehicle steering system by the EPS, AFS, or other system and the steering angle input applied by the operator of the vehicle (e.g., the driver) to steering wheel 82. Steering angle measured, $\delta_{meas}$, may be measured or evaluated by steering angle sensor(s), as depicted in block 214. Steering angle measured, $\delta_{meas}$, may include the amount of steering angle input applied to the steering wheel 82 or related system by driver, for example, to regain full or partial control of the vehicle steering system.

As depicted in block 210, the difference between steering angle measured, $\delta_{meas}$, and expected steering angle, $\delta_{expected}$, is calculated. If the absolute value or magnitude of the difference is greater than a pre-determined threshold steering angle, $\delta_{thresh}$, an automatic steering control system 90 may be de-activated, disengaged, or overridden by system 100. The pre-determined threshold steering angle, $\delta_{thresh}$, may be determined during or prior to manufacturing of vehicle 10 and may be based on vehicle testing, human factor studies, or other factors. The pre-determined threshold steering angle, $\delta_{thresh}$, some embodiments, include buffer or additional steering angle to take into account driver interaction with the steering system that is not intended to override automatic steering control system 90. While in one embodiment two factors (steering torque and steering angle) are used, in other embodiments only one factor, or different factors, may be used.

According to some embodiments of the present invention, autonomous steering override detection system 100 may calculate an expected torque, $\tau_{expected}$, using a second-order model approximation or other mathematical approach. In one embodiment, the following formula or differential equation may be solved algebraically, numerically, analytically or using another method to calculate expected torque, $\tau_{expected}$:

$$I_{equ}\ddot{\delta}+c_{equ}\dot{\delta}+k_{equ}\delta_{meas}=\tau_{driver}+\tau_{expected}+\tau_{SelfAlign}$$

A second-order model, formula or differential equation, one example of which is represented in the equation above, may be used to calculate the expected torque, $\tau_{expected}$. The expected torque, $\tau_{expected}$, may be calculated, determined, or derived based on the solution of the second-order differential equation. The expected torque, $\tau_{expected}$, may be the only unknown and may be derived based on pre-determined and measured data. The expected torque, $\tau_{expected}$, may be calculated at regular intervals or time steps, for example, every 10 milliseconds or another time period, or may be updated in real-time while the vehicle automated steering control system is engaged.

The terms $I_{equ}$, $c_{equ}$, and $k_{equ}$ may be predetermined constants or parameters. The terms may be determined using un-modeled steering dynamics parameter estimation techniques, during the calibration of the automated vehicle steering control override system 100 in manufacturing, human factor studies, or other methods or approaches. The equivalent steering inertia, $I_{equ}$, may represent the steering wheel, automated steering system or other system or device's tendency to resist change rotational acceleration. The equivalent steering damping $c_{equ}$ may represent the steering wheel, automated steering system or other system, device, or component's tendency to resist change rotational velocity or speed. The equivalent steering stiffness, $k_{equ}$, may represent the steering wheel, automated steering system or other system, device or component's resistance to displacement. Steering angle velocity, $\dot{\delta}$, may represent a first derivative of steering angle input and may be known and/or constrained by automated steering control override system dynamics, human factor studies, and/or calibration during manufacturing of system 100. Steering angle acceleration, $\ddot{\delta}$, may represent a second derivative of steering angle and may be known and/or constrained by automated steering control override system dynamics, human factor studies, and/or calibration during manufacturing of system 100. Steering angle measured, $\delta_{meas}$, may represent the steering angle measured by steering angle sensor 70 or another device. Driver inputted torque, $\tau_{driver}$, may represent the amount of torque the driver inputs to the steering wheel. In some embodiments, $\tau_{driver}$ may be zero, or another value, if the autonomous steering control system 90 is engaged, and the driver is not interacting with the steering wheel. Self-aligning torque, $\tau_{SelfAlign}$, may represent the torque applied to the vehicle steering system with no driver input or input from a vehicle automated steering system 90. Self-aligning torque, $\tau_{SelfAlign}$, may be inherent in the design of the vehicle and/or vehicle steering system and may be quantified during or prior to manufacturing.

Because the expected torque, $\tau_{expected}$, may be calculated by system 100 based on measured vehicle steering measurements and pre-determined constants and may be calculated at regular time intervals, the expected torque, $\tau_{expected}$, may be adjusted by system 100 based on different driving scenarios and/or conditions. The expected torque, $\tau_{expected}$, may, for example, be higher at low speeds than high speeds. System 100 may, for example, calculate a higher expected torque, $\tau_{expected}$, on curved or banked roads than on flat roads depending on the direction of the curve or bank. Vehicle automated steering override detection system 100 may therefore function accurately and precisely at low speeds, high speeds, on banked roads, on curved roads and in other driving scenarios.

According to some embodiments of the present invention, autonomous steering override detection system 100 may calculate a steering command torque, $\tau_{cmd}$, using a second-order model approximation or other mathematical approach. In one embodiment the following formula or differential equation may be solved algebraically, numerically, analytically or using another method to calculate steering command torque, $\tau_{cmd}$:

$$I_{equ}\ddot{\delta}+c_{equ}\dot{\delta}+k_{equ}\delta_{cmd}=\tau_{driver}+\tau_{cmd}+\tau_{SelfAlign}$$

A second-order model, formula or differential equation, one example of which is represented in the equation above, may be used to calculate the steering command torque, $\tau_{cmd}$. The steering command torque, $\tau_{cmd}$, may calculated, determined, or derived based on the solution of the second-order differential equation. The steering command torque, $\tau_{cmd}$, may be the only unknown and may be derived based on pre-determined and measured data. The steering command torque, $\tau_{cmd}$, may be calculated at regular intervals or time steps, for example, every 10 milliseconds or another time period, or may be updated in real-time while the vehicle automated steering control system 90 is engaged.

Steering angle command, $\delta_{cmd}$, may be output by a vehicle automated steering system 90. The constants $I_{equ}$, $c_{equ}$, $k_{equ}$, $\dot{\delta}$, $\ddot{\delta}$, $\tau_{driver}$, and $\tau_{SelfAlign}$ may be the same or similar to the constants used in the second order model to calculate torque expected, $\tau_{expected}$, as discussed above.

The second order models discussed above are one example that may be used to determine steering torque expected, $\tau_{expected}$, and steering torque command, $\tau_{cmd}$; however, other values, constants, formulas, mathematical models, systems, look-up tables, linear transformations, and other methods or mathematical approaches may also be used.

Figure 5:
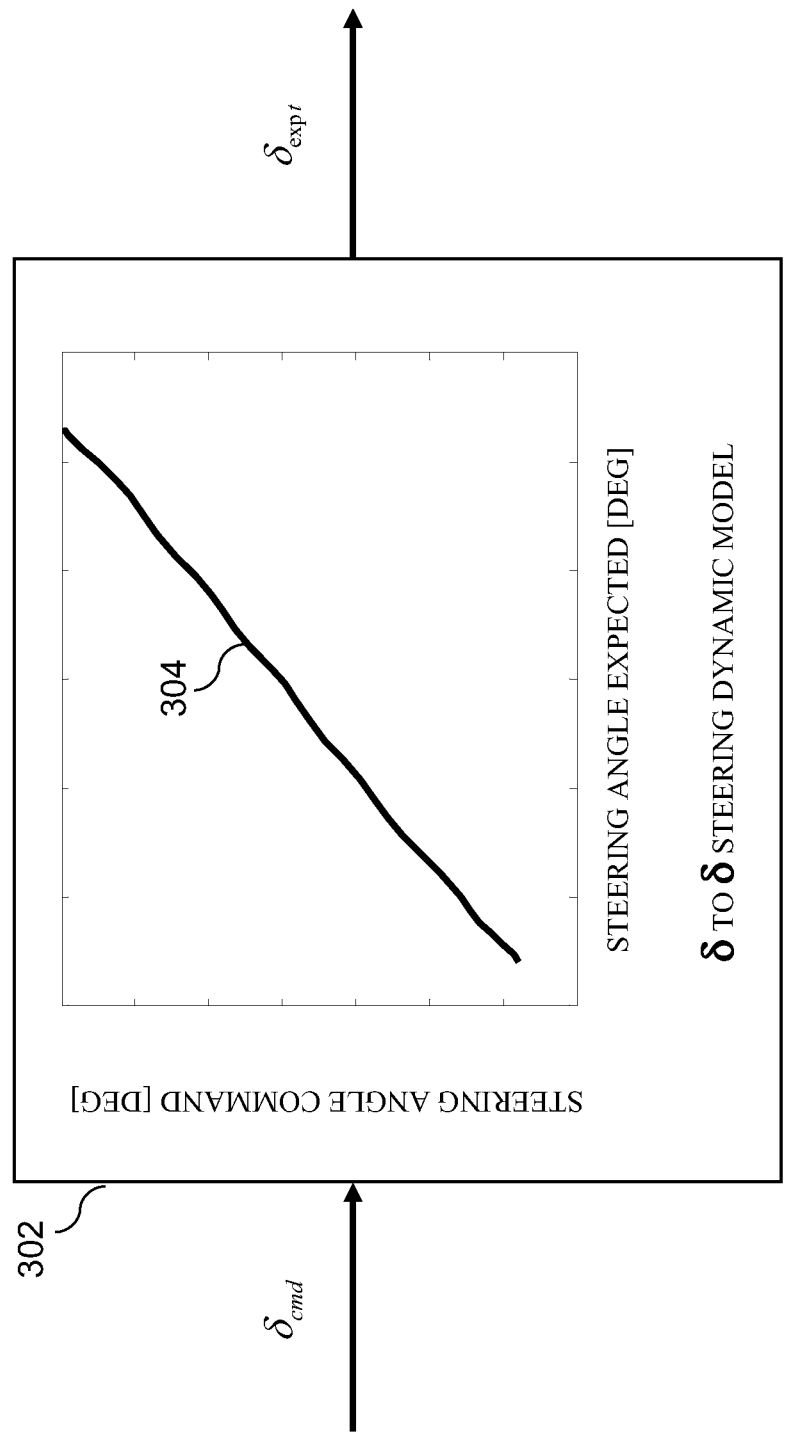
FIG. 5 is a schematic diagram and graph of steering angle command with respect to steering angle expected according to an embodiment of the present invention.

FIG. 5 is a schematic diagram and graph of steering angle command with respect to an expected steering angle according to an embodiment of the present invention. Block 302 represents a steering angle command to steering angle expected dynamic model, calculation, determination, or formulation method according to an embodiment of the present invention. A steering angle dynamic model may be or include a look up table, simple second order system, linear transformation, a mathematical model, or other mathematical approach. As illustrated in block 302, steering angle expected, $\delta_{expected}$, may be calculated based on steering angle command, $\delta_{cmd}$. Graph segment 304 may represent the relationship between steering angle command, $\delta_{cmd}$, and steering angle expected, $\delta_{expected}$. In some embodiments, steering angle expected, $\delta_{expected}$, may be linearly proportional or approximately linearly proportional to steering angle command, $\delta_{cmd}$. Other relationships may also be used.

Figure 6:
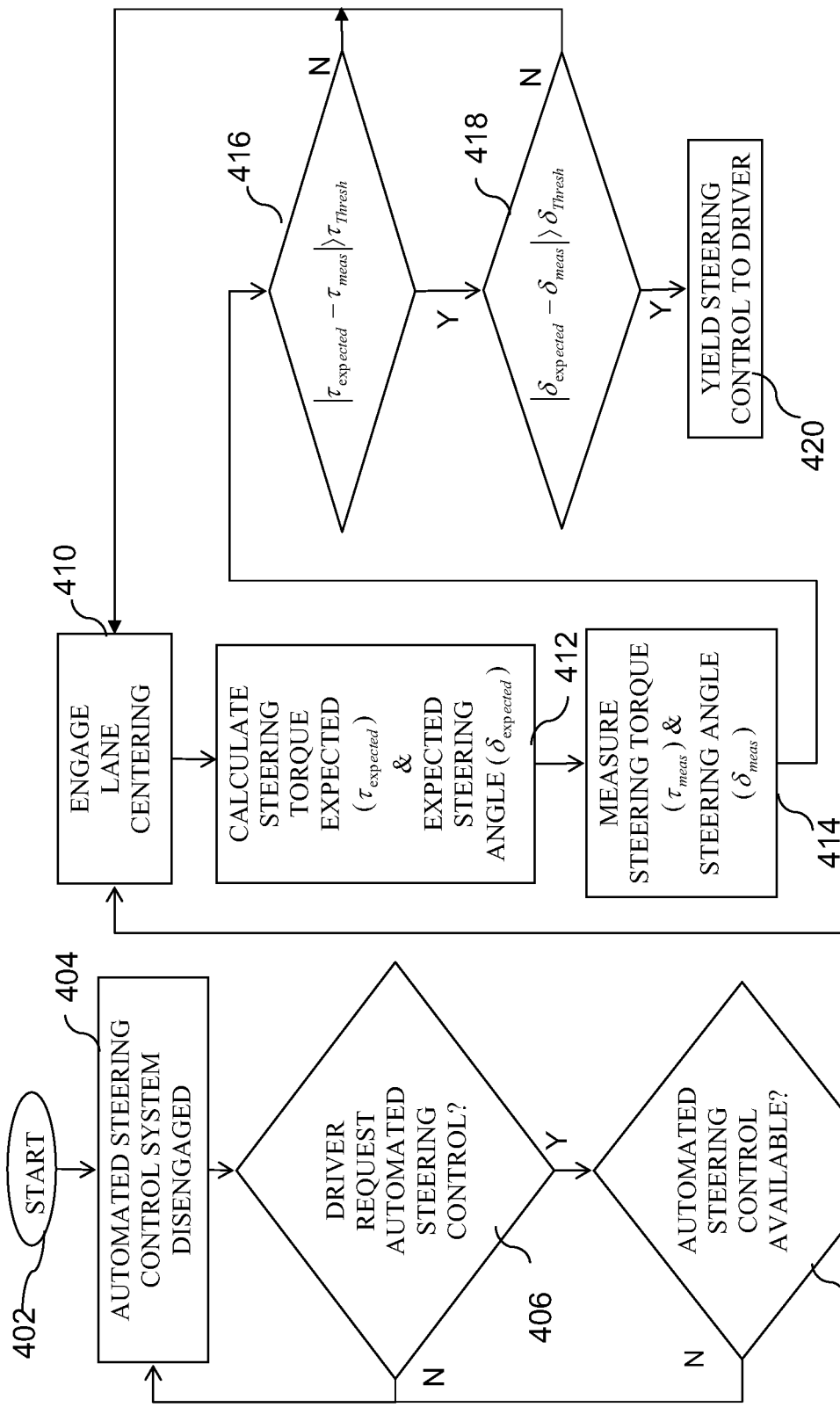
FIG. 6 is a flowchart of a method according to an embodiment of the present invention.

FIG. 6 is a flowchart of a method according to an embodiment of the invention. The operations may be carried out by vehicle automated steering override detection system 100 or by other systems associated with or separate from vehicle 10. As depicted in blocks 402 and 404, the system or process may be initiated when the vehicle automated steering control system 90 is not engaged or activated. As illustrated by block 406, an action (e.g., a push of a button, activation of a switch, etc.) may be performed by a driver to engage an automated steering control system 90. As illustrated in block 408, it may be determined by system 90 whether the automated steering control system is available and may be activated. As depicted in block 410, if automated steering control system 90 is available, the system may be engaged. When engaged, the automated steering control system 90 may then automatically control the direction and/or heading of vehicle travel. As depicted in block 412, at any time while the automated steering control system 90 is engaged, steering torque expected, $\tau_{expected}$, and steering angle expected, $\delta_{expected}$, may be calculated, determined, or formulated by system 100. Steering torque expected, $\tau_{expected}$, and steering angle expected, $\delta_{expected}$, may be calculated using a second order model, a simple second order model, the solution to a differential equation, a look-up table, a linear transformation or other mathematical model or approach. Steering torque expected, $\tau_{expected}$, and steering angle expected, $\delta_{expected}$, may be calculated at regular intervals (e.g., every 10 milliseconds or another time period) or may be calculated continuously by system 100 while automated steering control system 90 is engaged. As illustrated in block 414, vehicle may evaluate a plurality of vehicle steering conditions using a plurality of sensors associated with vehicle 10. For example, steering torque, $\tau_{meas}$, and steering angle, $\delta_{meas}$, may be evaluated or measured by system 100 using one or more sensor(s) associated with vehicle 10. Steering torque measured, $\tau_{meas}$, and steering angle measured, $\delta_{meas}$, may be measured or evaluated at regular intervals (e.g., every 10 milliseconds or another time period) or may be measured continuously by system 100 while automated steering control system 90 is engaged.

As illustrated in block 416, the difference between steering torque expected, $\tau_{expected}$, and steering torque measured, $\tau_{meas}$, may be calculated by system 100. The difference between steering torque expected, $\tau_{expected}$, and steering torque measured, $\tau_{meas}$, may be compared to a predetermined threshold torque, $\tau_{thresh}$, by system 100. In one embodiment, the absolute value of the difference between steering torque expected, $\tau_{expected}$, and steering torque measured, $\tau_{meas}$, may be compared to a predetermined threshold torque, $\tau_{thresh}$, by system 100. The predetermined threshold torque may be, for example, 3 Newton-meters (Nm) or another value. Other thresholds may be used. If the difference between steering torque expected, $\tau_{expected}$, and steering torque measured, $\tau_{meas}$, or the absolute value of the difference, is greater than threshold torque, $\tau_{thresh}$, vehicle automated steering control system 90 may be disengaged (e.g., by system 100) and steering control may be fully or partially relinquished to the driver, as depicted by block 420.

As illustrated in block 418, the difference between steering angle expected, $\delta_{expected}$, and steering angle measured, $\delta_{meas}$, may be calculated by system 100. The difference between steering angle expected, $\delta_{expected}$, and steering angle measured, $\delta_{meas}$, may be compared to a predetermined threshold angle, $\delta_{thresh}$, by system 100. In one embodiment, the absolute value of the difference between steering angle expected, $\delta_{expected}$, and steering angle measured, $\delta_{meas}$, may be compared to a predetermined threshold angle, $\delta_{thresh}$, by system 100. If the difference between steering angle expected, $\delta_{expected}$, and steering angle measured, $\delta_{meas}$, or absolute value of the difference, is greater than threshold angle, $\delta_{thresh}$, vehicle automated steering control system 90 may be disengaged (e.g., by system 100) and steering control may be fully or partially relinquished to the driver, as depicted by block 420.

According to some embodiments of the present invention, both the difference between steering torque expected, $\tau_{expected}$, and steering torque measured, $\tau_{meas}$, and the difference between steering angle expected, $\delta_{expected}$, and steering angle measured, $\delta_{meas}$, may be calculated by system 100. If the difference, absolute value of the difference, or magnitude of the difference between steering torque expected, $\tau_{expected}$, and steering torque measured, $\tau_{meas}$, is greater than threshold torque, $\tau_{thresh}$, and the difference, absolute value of the difference, or magnitude of the difference between steering angle expected, $\delta_{expected}$, and steering angle measured, $\delta_{meas}$, is greater than threshold angle, $\delta_{thresh}$, vehicle automated steering control system 90 may be disengaged and steering control may be fully or partially relinquished to the driver, as depicted by block 420. Thus, if the evaluated vehicle dynamic conditions indicate the operator of the vehicle (e.g., the driver) is overriding the autonomous driving application, the autonomous driving application (e.g., adaptive lane centering system) may be deactivated.

An alert, indication, alarm or signal may be provided to the driver by system 100 prior to or after disengaging and/or de-activating the automated steering control system 90. The alert may be, for example, an audible alert, light, signal, notification or other form of alert.

Other or different series of operations may be used.

Figure 7:
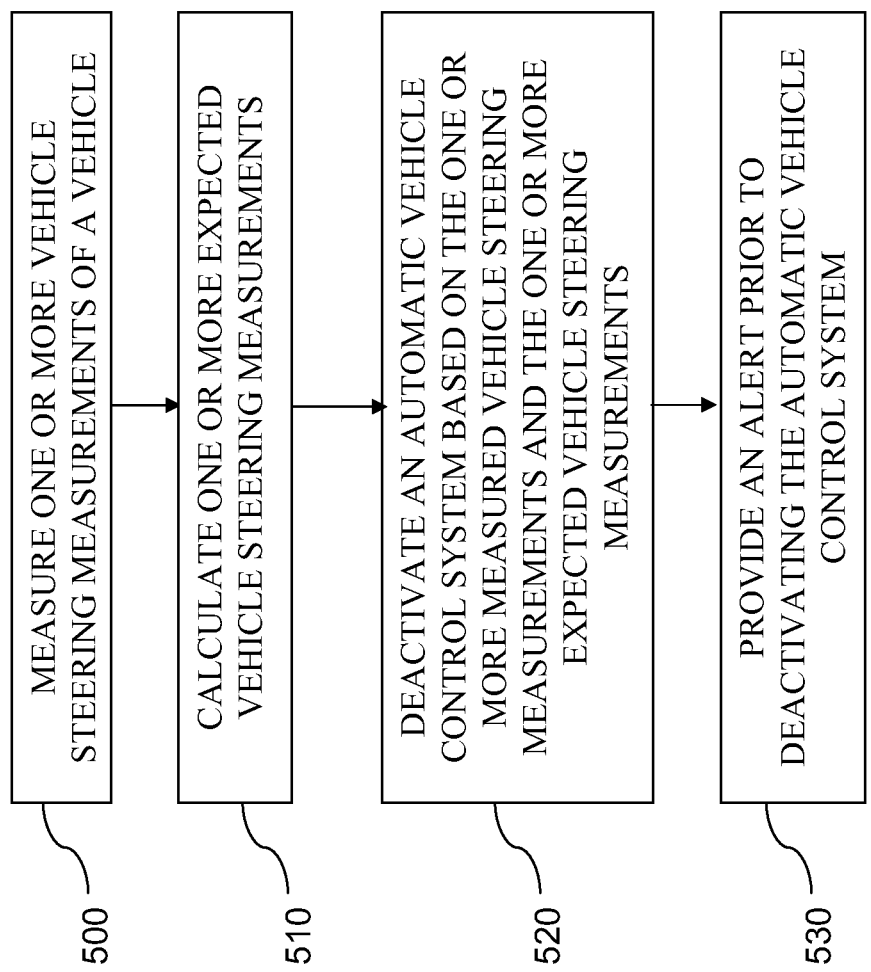
FIG. 7 is a flowchart of a method according to an embodiment of the present invention.

FIG. 7 is a flowchart of a method according to an embodiment of the present invention.

In operation 500, one or more vehicle steering measurements of a vehicle may be measured. The one or more vehicle steering measurements may, for example, be measured by steering angle sensor (e.g., steering angle sensor 70 in FIG. 1), steering torque sensor (e.g., a torsion bar, torsion sensor, or steering torque sensor 80 in FIG. 1), or other device.

In operation 510, one or more expected vehicle steering measurements may be calculated. The one or more expected vehicle steering measurements may, for example, be calculated using a second order system mathematical approach, look-up table, or other method or approach.

In operation 520, an automatic vehicle control system (e.g., system 90 in FIG. 1) may, based on the one or more measured vehicle steering measurements and the one or more expected vehicle steering measurements, be deactivated. For example, system 100 may send a signal or command to system 90 to deactivate. The one or more vehicle steering measurements may include a vehicle steering angle measurement, vehicle steering torque measurement, vehicle steering angle condition, vehicle steering torque condition, vehicle yaw-rate, vehicle lateral acceleration, vehicle longitudinal acceleration, or other vehicle dynamics measurements.

In operation 530, system 100 may provide an alert prior to deactivating or disengaging the automatic vehicle control system 90. The alert may be issued, for example, to a driver or to a vehicle automatic steering control system 90. The alert may inform the driver that the automatic steering control system 90 may be disengaged.

Other or different series of operations may be used.

Embodiments of the present invention may include apparatuses for performing the operations described herein. Such apparatuses may be specially constructed for the desired purposes, or may include computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Features of various embodiments discussed herein may be used with other embodiments discussed herein. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method comprising:
    measuring one or more vehicle steering measurements of a vehicle;
    calculating an expected torque based on said measured vehicle steering measurements, wherein said expected torque comprises equivalent steering inertia, equivalent steering damping and equivalent steering stiffness;
    calculating by a computing device one or more expected vehicle steering measurements, based on at least a command associated with each said measurement, and based on at least a road condition; and
    deactivating an automatic vehicle control system based on the one or more measured vehicle steering measurements, the calculated expected torque and the one or more expected vehicle measurements.

2. The method of claim 1, wherein the one or more vehicle steering measurements comprises a vehicle steering angle measurement and a vehicle steering torque measurement, and said steering torque measurement is based at least on a plurality of steering angle velocity, steering angle acceleration, a command torque from said automatic vehicle control system and driver inputted torque.

3. The method of claim 1, wherein deactivating the automatic vehicle control system based on the one or more measured vehicle steering measurements and the one or more expected vehicle steering measurements comprises calculating a difference between the one or more measured vehicle steering measurements and the one or more expected vehicle steering measurements.

4. The method of claim 1, wherein calculating the one or more expected vehicle steering measurements comprises using a second order system mathematical approach.

5. The method of claim 1, wherein deactivating the automatic vehicle control system based on the one or more measured vehicle steering measurements and the one or more expected vehicle steering measurements comprises determining whether a difference between the measured one or more vehicle steering measurements and the one or more expected vehicle steering measurements exceeds one or more vehicle steering measurement thresholds.

6. The method of claim 1, wherein the automatic vehicle control system comprises an automated lane centering system.

7. The method of claim 1, comprising providing an alert prior to deactivating the automatic vehicle control system.

8. A system comprising:
    a vehicle automated steering system;
    one or more sensors; and
    a controller to:
        measure one or more vehicle steering measurements of a vehicle;
        calculate an expected torque based on said measured vehicle steering measurements, wherein said expected torque comprises equivalent steering inertia, equivalent steering damping and equivalent steering stiffness;
        calculate one or more expected vehicle steering measurements, based on at least a command associated with each said measurement, and based on at least a road condition; and
        deactivate the vehicle automated steering system based on the one or more measured vehicle steering measurements, the calculated expected torque and the one or more expected vehicle steering measurements.

9. The system of claim 8, wherein the one or more vehicle steering measurements comprises a steering angle measurement and a steering torque measurement, and said steering torque measurement is based at least on a plurality of steering angle velocity, steering angle acceleration, a command torque from said automatic vehicle control system and driver inputted torque.

10. The system of claim 8, wherein to deactivate the vehicle automated steering system based on the one or more measured vehicle steering measurements and the one or more expected vehicle steering measurements the controller is to calculate a difference between the one or more measured vehicle steering measurements and the one or more expected vehicle steering measurements.

11. The system of claim 8, wherein the controller is to calculate the one or more expected vehicle steering measurements using a second order system mathematical approach.

12. The system of claim 8, wherein to deactivate the vehicle automated steering system based on the one or more measured vehicle steering measurements and the one or more expected vehicle steering measurements the controller is to determine whether a difference between the measured one or more vehicle steering measurements and the one or more expected vehicle steering measurements exceeds one or more vehicle steering measurements thresholds.

13. The system of claim 8, wherein the vehicle automated steering system comprises an adaptive lane centering system.

14. The system of claim 8, wherein the controller is to provide an alert prior to deactivating the vehicle automated steering system.

15. A method comprising:
    in a vehicle, evaluating a plurality of vehicle steering conditions using a plurality of sensors associated with the vehicle;

calculating an expected torque based on the evaluated vehicle steering conditions, wherein said expected torque comprises equivalent steering inertia, equivalent steering damping and equivalent steering stiffness;

determining a plurality of expected vehicle steering conditions, based on at least a command associated with each said condition, and based on at least a road condition; and disengaging an autonomous driving application if the evaluated vehicle steering conditions, the calculated expected torque and the expected vehicle steering conditions indicate an operator of the vehicle is overriding the autonomous driving application.

16. The method of claim 15, wherein the plurality of vehicle steering conditions comprise a vehicle steering angle condition and a vehicle steering torque condition, and said steering torque condition is based at least on a plurality of steering angle velocity, steering angle acceleration, a command torque from said automatic vehicle control system and driver inputted torque.

17. The method of claim 15, wherein the plurality of sensors comprise a steering angle sensor and a torque steering sensor.

18. The method of claim 15, wherein disengaging the autonomous driving application if the evaluated vehicle steering conditions and the expected vehicle steering conditions indicate the operator of the vehicle is overriding the autonomous driving application comprises determining a difference between the plurality of expected vehicle steering conditions and the plurality of evaluated vehicle steering conditions.

19. The method of claim 15, wherein determining the plurality of expected vehicle steering conditions comprises using a look-up table mathematical approach.

20. The method of claim 15, disengaging the autonomous driving application if the evaluated vehicle steering conditions and the expected vehicle steering conditions indicate the operator of the vehicle is overriding the autonomous driving application comprises evaluating whether a difference between the evaluated vehicle steering conditions and the expected vehicle steering conditions exceeds one or more vehicle steering condition thresholds.

* * * * *